United States Patent
Hughes, Jr. et al.

(10) Patent No.: US 7,258,495 B1
(45) Date of Patent: Aug. 21, 2007

(54) LENSED FIBER STUB ASSEMBLIES OPTICAL AND OPTOELECTRONIC PACKAGES INCLUDING THEM

(75) Inventors: Lawrence Charles Hughes, Jr., Corning, NY (US); Karen Irene Matthews, Horseheads, NY (US); William James Miller, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/475,488

(22) Filed: Jun. 26, 2006

Related U.S. Application Data

(60) Provisional application No. 60/693,580, filed on Jun. 24, 2005.

(51) Int. Cl.
- *G02B 6/32* (2006.01)
- *G02B 6/26* (2006.01)
- *G02B 6/42* (2006.01)
- *G02B 6/36* (2006.01)

(52) U.S. Cl. .................. 385/93; 385/31; 385/33; 385/35; 385/38; 385/88; 385/92

(58) Field of Classification Search .............. 385/93
See application file for complete search history.

(56) References Cited

U.S. PATENT DOCUMENTS

| | | | |
|---|---|---|---|
| 5,113,466 A | 5/1992 | Acarlar et al. | 385/88 |
| 5,216,737 A * | 6/1993 | Driessen et al. | 385/93 |
| 5,381,499 A * | 1/1995 | Takenaka et al. | 385/93 |
| 5,570,444 A * | 10/1996 | Janssen et al. | 385/90 |
| 6,071,016 A | 6/2000 | Ichino et al. | 385/92 |
| 6,282,350 B1 * | 8/2001 | Takahashi et al. | 385/88 |
| 6,296,400 B1 * | 10/2001 | Uchiyama et al. | 385/94 |
| 6,304,352 B1 | 10/2001 | Cunningham et al. | 359/152 |
| 6,513,992 B2 * | 2/2003 | Andersen et al. | 385/92 |
| 6,524,016 B1 * | 2/2003 | Ohki et al. | 385/88 |
| 6,609,834 B2 | 8/2003 | Cunningham et al. | 385/60 |
| 6,757,308 B1 | 6/2004 | Eldring et al. | 372/36 |
| 2004/0033034 A1 * | 2/2004 | Miyokawa et al. | 385/93 |

* cited by examiner

*Primary Examiner*—Frank G. Font
*Assistant Examiner*—Ryan Lepisto
(74) *Attorney, Agent, or Firm*—Timothy M. Schaeberle

(57) ABSTRACT

The present invention relates to lensed fiber stub assemblies and optical and optoelectronic packages including them. The fiber stub assemblies include a section of lensed fiber having a lensed end having a lens face, and a distal end having an endface, a lens alignment ferrule affixed to and holding the lensed end of the lensed fiber, and a package attachment ferrule having a distal endface and an exterior surface, the package attachment ferrule affixed to and holding the distal end of the lensed fiber. The lensed fiber stub assemblies of the present invention allow for hermetic packaging of optical and optoelectronic devices, good manufacturing throughput, facile package connectorization, acceptable device thermal performance, and ease of alignment in the packaging process.

18 Claims, 2 Drawing Sheets

LENSED FIBER STUB ASSEMBLIES OPTICAL AND OPTOELECTRONIC PACKAGES INCLUDING THEM

This application claims the benefit of U.S. Provisional Application No. 60/693,580, filed Jun. 24, 2005.

STATEMENT REGARDING FEDERALLY-SPONSORED RESEARCH OR DEVELOPMENT

This invention was made with Government support under MDA904-03-C-0423 awarded by the Maryland Procurement Office. The Government has certain rights in this invention.

BACKGROUND OF THE INVENTION

1. Field of the Invention

The present invention relates generally to optical and optoelectronic system packaging. More specifically, the invention relates to lensed fiber stub assemblies and optical and optoelectronic packages including them.

2. Technical Background

The task of packaging of optical and optoelectronic subsystems into useable system components presents a number of challenges. A functional optical connection must be made from the optical or optoelectronic subsystem to a port on the outside of the package. The port on the outside of the package is desirably adapted to be connected with a standard optical cable, with passive alignment providing a low-loss optical connection between the package and an optical fiber within the cable. Further, for many applications, a hermetically sealed package is required in order to protect the sensitive electronic components from moisture and/or oxygen.

Conventional techniques for packaging optical and optoelectronic subsystems rely on a short length of optical fiber (an optical fiber "stub") to transport an optical signal from a connected optical cable through a port on the side of the package and into the package interior, and a lens system (typically a spherical lens) to couple (typically by focusing) the light from the fiber stub into the optical or optoelectronic system. However, due to the sizes of the lenses required, the low-throughput assembly process, the need to separately align the fiber stub and lens system with respect to the optical or optoelectronic system, and difficulties in acquiring low cost lenses of suitable tolerance, conventional packaging techniques are difficult to employ in an efficient, cost-effective manufacturing process.

SUMMARY OF THE INVENTION

One embodiment of the present invention relates to an supporting structure, the supporting structure having at least one hole formed therein, each of the holes having a sidewall; an optical or optoelectronic subsystem disposed upon the supporting structure, the optical or optoelectronic subsystem having an optical input or output; at least one lensed fiber stub assembly, each lensed fiber stub assembly including a section of lensed fiber having a lensed end having a lens face, and a distal end having an endface, a lens alignment ferrule affixed to and holding the lensed end of the lensed fiber, the lens alignment ferrule being affixed to the optical or optoelectronic system or the supporting structure and holding the lens face of the lensed end of the lensed fiber in operative alignment with the optical input or output of the optical or optoelectronic system, and a package attachment ferrule having a distal endface and an exterior surface, the package attachment ferrule affixedly holding the distal end of the lensed fiber, the package attachment ferrule being attached to the sidewall of one of the at least one holes formed in the supporting structure, and disposed through the hole, so that the endface of the distal end of the lensed fiber is optically coupled to the exterior of the supporting structure.

Another embodiment of the present invention relates to a section of lensed fiber having a lensed end having a lens face, and a distal end having an endface, a lens alignment ferrule affixed to and holding the lensed end of the lensed fiber, and a package attachment ferrule having a distal endface and an exterior surface, the package attachment ferrule affixed to and holding the distal end of the lensed fiber.

The devices and methods of the present invention result in a number of advantages over prior art devices and methods. For example, the lensed fiber stub assemblies of the present invention allow for hermetic packaging of optical and optoelectronic devices, good manufacturing throughput, facile package connectorization, acceptable device thermal performance, and ease of alignment in the packaging process.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. For example, for the sake of clarity, not all distal ends of the optical fibers are shown in the drawings. The drawings illustrate one or more embodiment(s) of the invention, and together with the description serve to explain the principles and operation of the invention.

DETAILED DESCRIPTION OF THE INVENTION

Figure 1:
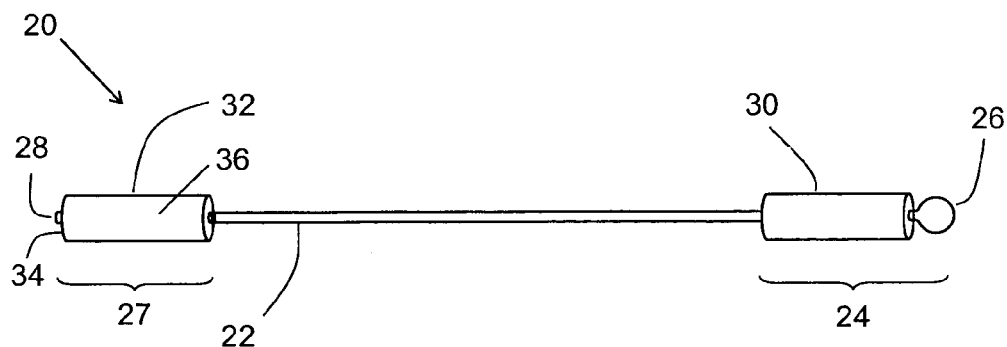
FIG. 1 is a schematic side view of a lensed fiber stub assembly according to one aspect of the present invention.

An example of a lensed fiber stub assembly according to one aspect of the present invention in shown in schematic side view in FIG. 1. The lensed fiber stub assembly 20 includes a section of lensed fiber 22, having a lensed end 24 and a lensed face 26. Lensed fiber 22 also has a distal end 27 having an endface 28. A lens alignment ferrule 30 is affixed to and holds the lensed end 24 of the lensed fiber 22. A package attachment ferrule 32, having a distal endface 34 and an exterior surface 36, is affixed to and holds the distal end 27 of the lensed fiber 22.

The lensed fiber may be of any suitable type that provides the desired focusing characteristics, including those having lenses of ball shape (as shown in FIG. 1), bullet shape, or tapered shape. The lens face of the lensed optical fiber may be coated with a coating (e.g., an AR coating). Lensed fibers are available from many commercial suppliers, including Corning Incorporated of Corning, N.Y.

The section of lensed fiber desirably is of relatively short length. For example, the section of lensed fiber is desirably less than 30 cm in length. More desirably, the section of lensed fiber is less than 20 cm in length. In certain desirable embodiments of the invention, the section of lensed fiber is less than 10 cm in length, or even less than 5 cm in length.

The ferrules 30 and 32 are affixed to the lensed optical fiber. Desirably, the ferrules are affixed using a glass solder material. However, one or both ferrules may be attached using another attachment material, such as an organic adhesive (e.g., epoxy). The ferrules, especially the package attachment ferrule, are desirably sealed to the lensed fiber in an airtight manner.

The lens alignment ferrule can be of any suitable shape, size, and material for inclusion in a desired optical or optoelectronic package. As the skilled artisan will recognize, the type of ferrule used as the lens alignment ferrule will depend strongly upon the particular materials and geometry of the optical or optoelectronic subsystem and of the supporting structure. For example, the lens alignment ferrule may be a glass or glass-ceramic cylindrical ferrule.

The package attachment ferrule may also be of any suitable shape, size, and material for inclusion in a desired optical or optoelectronic package. The package attachment ferrule will also desirably be of optical connector grade, chosen to mate with a desired type of connectorized optical cable. The package attachment ferrule may have, for example, a distal endface fabricated to mate with a standard LC-APC ferrule of an optical cable. The distal endface may be, for example, flat (either normal to the optical axis, or at a small angle, e.g., 8°, from normal), chamfered, or rounded.

In especially desirable embodiments of the invention, the package attachment ferrule is adapted to be hermetically sealable with a desired supporting structure, for use in forming a hermetically sealed optical or optoelectronic package. For example, in desired embodiments of the invention, the exterior surface of the package attachment ferrule is metallized. One suitable material for the package attachment ferrule is metallized zirconia.

Figure 2:
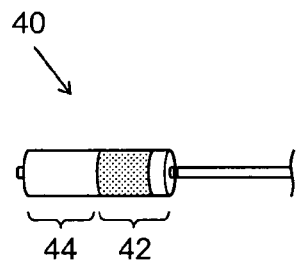
FIG. 2 is a schematic side view of a package attachment ferrule according to one embodiment of the present invention.
Figure 3:
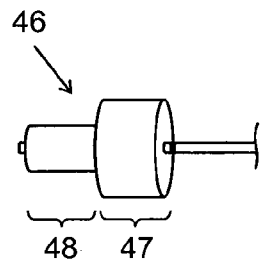
FIG. 3 is a schematic side view of a package attachment ferrule according to another embodiment of the present invention.

In an especially desirable embodiment of the invention, shown in schematic side view in FIG. 2, the package attachment ferrule 40 has a proximal section 42 and a distal section 44 having a different exterior surface than the proximal section. The proximal section is disposed nearer the lensed end of the lensed fiber than is the distal section. The proximal section is desirably adapted to be hermetically sealable with a desired supporting structure. For example, the proximal section can be metallized. The distal section is desirably adapted to be of optical connector grade. Further, as shown in FIG. 3, the distal section 47 and the proximal section 48 of a package attachment ferrule 46 may have different cross-sectional shapes and/or areas, so that the proximal end may fit a hole of a desired shape in a supporting structure of an optical or optoelectronic package. The two sections may be formed, cut, or molded from a single piece of material, or may be formed separately and joined together to form the package attachment ferrule.

In certain desirable embodiments of the invention, the distal endface and the endface of the distal end of the lensed fiber are polished together so that endface of the distal end of the lensed fiber is polished flush with or slightly recessed from the distal endface of the package attachment ferrule. As the skilled artisan will appreciate, polishing the endfaces of the ferrule and the fiber allow for closer mechanical coupling of the endface of the distal end of the lensed fiber with a connected optical cable, and form a higher optical quality surface on the endface of the distal end of the lensed fiber.

Figure 4:
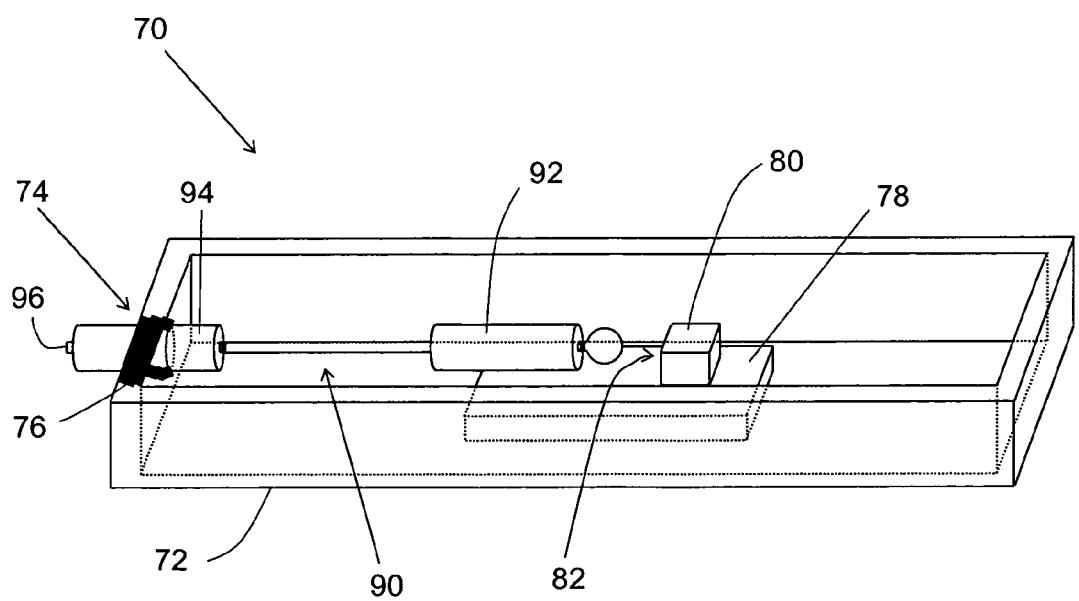
FIG. 4 is a schematic view of an optical or optoelectronic package according to one embodiment of the present invention.

An optical or optoelectronic package according to another embodiment of the invention is shown in schematic view in FIG. 4 The optical or optoelectronic package 70 includes a supporting structure 72, having at least one hole 74 formed therein. The hole has a sidewall 76. The optical or optoelectronic package 70 also includes an optical or optoelectronic system 80 disposed upon the supporting structure. The optical or optoelectronic system has an optical input or output 82. The optical or optoelectronic package 70 further includes at least one lensed fiber stub assembly 90, substantially as described above. The lens alignment ferrule 92 of lensed fiber stub assembly 90 is affixed to the optical or optoelectronic system or the supporting structure. For example, in FIG. 4, the supporting structure 72 includes a pedestal 78 that is configured to provide an attachment surface for both the lens alignment ferrule 92 and the optical or optoelectronic system 80. The package attachment ferrule 94 of lensed fiber stub assembly 90 is disposed through the hole 74, and attached to the sidewall 76, so that the endface 96 of the distal end of the lensed fiber is optically coupled to the exterior of the supporting structure. Desirably, as shown in FIG. 4, the endface 96 of the distal end of the lensed fiber is optically coupled to the exterior of the supporting structure.

Figure 5:
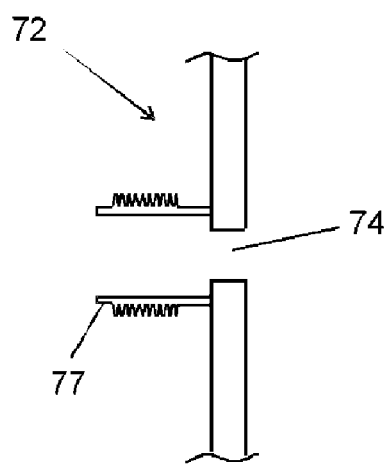
FIG. 5 is a schematic cross-sectional view of a supporting structure according to one embodiment of the present invention.
Figure 6:
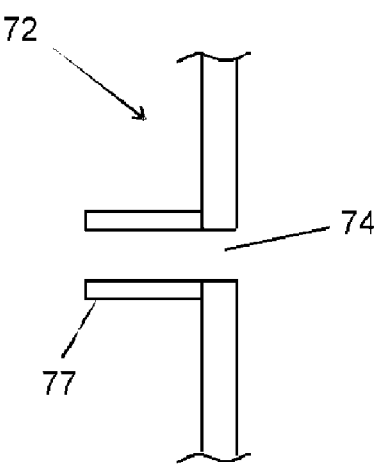
FIG. 6 is a schematic cross-sectional view of a supporting structure according to another embodiment of the present invention.
Figure 7:
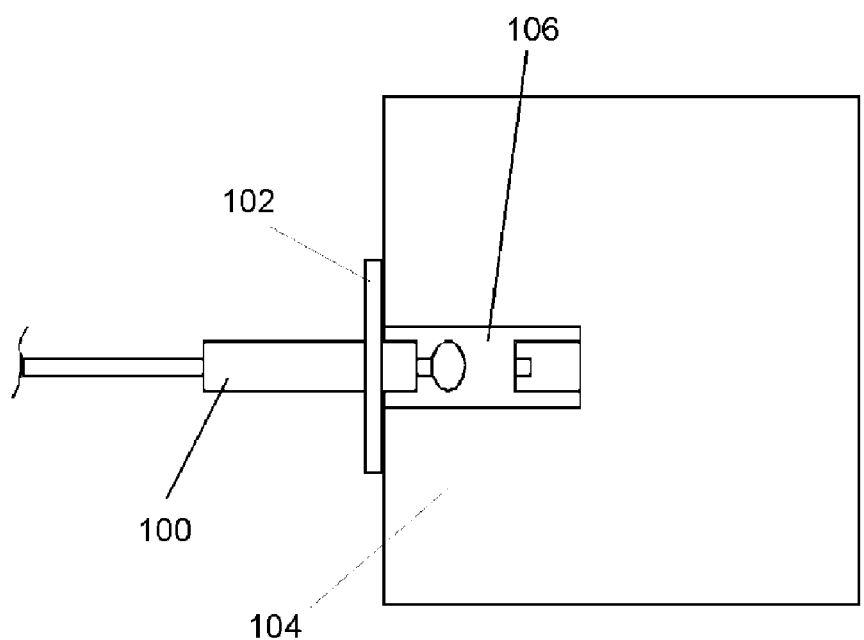
FIG. 7 is a schematic top view of an example of an attachment method for a lens alignment ferrule.

The supporting structure 72 may take a number of forms depending on the particular optical or optoelectronic device being constructed. In a particularly desirable embodiment of the invention, the supporting structure 72 is a hermetically sealed enclosure. The supporting structure 72 may be made of any desirable material, including plastic and metal. As shown in side cross-sectional view in FIG. 5, the supporting structure 72 might include a connector mating structure 77 disposed around the hole 74. The connector mating structure is adapted to optically couple a connectorized optical fiber cable to the endface 76 of the distal end of the lensed fiber. As the skilled artisan will appreciate, the connector mating structure can be adapted to mate with any desired type of connectorized optical cable. Alternatively, as shown in FIG. 6, the supporting structure 72 may include a collar 79 formed around the hole 74 in order to increase the surface area of the sidewall of the hole for attachment of a package attachment ferrule.

In desirable embodiments of the invention, the package attachment ferrule is hermetically sealed with the hole formed in the supporting structure. Hermetic sealing of the package attachment ferrule is especially desirable when the supporting structure is a hermetically sealed enclosure.

Hermetic sealing of a package attachment ferrule can be performed using a metallized ferrule with a metal enclosure, with solder (e.g. lead-tin solder) forming the seal.

The lens alignment ferrule can be attached to the supporting structure or to the optical or optoelectronic subsystem using methods familiar to the skilled artisan. Passive physical alignment structures can be used to position the lens endface of the lensed fiber with respect to the optical or optoelectronic system. Alternatively, active alignment can be used. An organic adhesive (e.g. epoxy) can be used to affix the lens alignment ferrule. One example of a suitable attachment method is shown in top schematic view in FIG. 6. Lens alignment ferrule 100 is glued within an annular glass ring 102. An optoelectronic system is held on a supporting structure 104, which has a recessed area 106 in which the ferrule and the lens face of the lensed fiber are disposed. The annular glass ring 102 is glued to a side of the supporting structure 104.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical or optoelectronic package comprising
   a supporting structure, the supporting structure having at least one hole formed therein, the at least one hole having a sidewall;
   an optical or optoelectronic subsystem disposed upon the supporting structure, the optical or optoelectronic subsystem having an optical input or output;
   at least one lensed fiber stub assembly, the at least one lensed fiber stub assembly including
      a section of lensed fiber having a lensed end having a lens face, and a distal end having an endface,
      a lens alignment ferrule affixed to and holding the lensed end of the lensed fiber, the lens alignment ferrule being affixed to the optical or optoelectronic system or the supporting structure and holding the lens face of the lensed end of the lensed fiber in operative alignment with the optical input or output of the optical or optoelectronic system, and
      a package attachment ferrule having a distal endface and an exterior surface, the package attachment ferrule affixedly holding the distal end of the lensed fiber, the package attachment ferrule being attached to the sidewall of the at least one hole formed in the supporting structure, and disposed through the at least one hole, so that the endface of the distal end of the lensed fiber is optically coupled to the exterior of the supporting structure, wherein the package attachment ferrule has a proximal section and a distal section and the exterior surface of the proximal section is different from the exterior surface of the distal section.

2. The optical or optoelectronic package of claim 1, wherein the endface of the distal end of the lensed fiber is disposed outside of the supporting structure.

3. The optical or optoelectronic package of claim 1, wherein the supporting structure further includes a connector mating structure disposed around the at least one hole formed in the supporting structure, the connector mating structure being adapted to optically couple a connectorized optical fiber cable to the endface of the distal end of the lensed fiber.

4. The optical or optoelectronic package of claim 1, wherein the package attachment ferrule is hermetically sealed with the at least one hole formed in the supporting structure.

5. The optical or optoelectronic package of claim 1, wherein the proximal section is adapted to be hermetically sealable with the at least one hole formed in the supporting structure.

6. The optical or optoelectronic package of claim 5, wherein the proximal section of the package attachment ferrule has a metallized surface.

7. The optical or optoelectronic package of claim 6, wherein the distal section of the package attachment ferrule is of optical connector grade.

8. The optical or optoelectronic package of claim 1, wherein the section of lensed fiber is less than 30 cm in length.

9. The optical or optoelectronic package of claim 1, wherein the supporting structure is a hermetically sealed enclosure.

10. A lensed fiber stub assembly comprising:
   a section of lensed fiber having a lensed end having a lens face, and a distal end having an endface,
   a lens alignment ferrule affixed to and holding the lensed end of the lensed fiber, and
   a package attachment ferrule having a distal endface and an exterior surface, the package attachment ferrule affixed to and holding the distal end of the lensed fiber, wherein the package attachment has a proximal section and a distal section and the exterior surface of the proximal section is different from the exterior surface of the distal section.

11. The lensed fiber stub assembly of claim 10, wherein the proximal section is nearer the lensed end of the section of lensed fiber than the distal section.

12. The lensed fiber stub assembly of claim 11, wherein the exterior surface of the proximal section of the package attachment ferrule is metallized.

13. The lensed fiber stub assembly of claim 12, wherein the distal section of the package attachment ferrule is of optical connector grade.

14. The lensed fiber assembly of claim 11, wherein the distal section and the proximal section of the package attachment ferrule have different cross-sectional shapes and/or sizes.

15. The lensed fiber stub assembly of claim 10, wherein the packaged attachment ferrule has a metallized surface.

16. The lensed fiber stub assembly of claim 10, wherein the section of lensed fiber is less than 30 cm in length.

17. The lensed fiber stub assembly of claim 10, wherein the distal end of the lensed fiber is held in the package attachment ferrule by glass solder.

18. The lensed fiber stub assembly of claim 10, wherein the lensed end of the lensed fiber is held in the lens alignment ferrule by glass solder.

* * * * *